United States Patent
Gibson et al.

(10) Patent No.: US 9,316,886 B2
(45) Date of Patent: Apr. 19, 2016

(54) REFLECTIVE COLOR DISPLAY PIXEL

(75) Inventors: Gary Gibson, Palo Alto, CA (US); Xia Sheng, Palo Alto, CA (US); Dick Henze, San Carlos, CA (US)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 5 days.

(21) Appl. No.: 14/114,188
(22) PCT Filed: Apr. 30, 2011
(86) PCT No.: PCT/US2011/034706
§ 371 (c)(1),
(2), (4) Date: Oct. 25, 2013
(87) PCT Pub. No.: WO2012/150921
PCT Pub. Date: Nov. 8, 2012

(65) Prior Publication Data
US 2014/0055833 A1 Feb. 27, 2014

(51) Int. Cl.
G02F 1/01 (2006.01)
G02F 1/19 (2006.01)
G02F 1/1335 (2006.01)

(52) U.S. Cl.
CPC ............ *G02F 1/19* (2013.01); *G02F 1/133553* (2013.01); *G02F 2001/133614* (2013.01); *G02F 2203/34* (2013.01)

(58) Field of Classification Search
CPC ............... G02F 2203/34; G02F 2011/133614; G02F 1/19
USPC ................ 359/238, 237, 318, 326, 344, 359, 359/485.06, 491.01, 577–579; 345/76, 83, 345/84; 349/61, 69; 362/559; 372/20, 32, 372/50.11, 75, 99
See application file for complete search history.

(56) References Cited

U.S. PATENT DOCUMENTS

| 6,184,951 B1 * | 2/2001 | Harrold et al. .................. 349/74 |
| 7,450,196 B2 | 11/2008 | Lee et al. |
| 7,826,131 B2 | 11/2010 | Arsenault et al. |
| 7,889,420 B2 | 2/2011 | Gibson |
| 8,780,026 B2 * | 7/2014 | Mun et al. ........................ 345/87 |
| 2008/0030635 A1 | 2/2008 | Chien et al. |

FOREIGN PATENT DOCUMENTS

| KR | 102004010000 | 12/2004 |
| WO | 03034135A1 | 4/2003 |
| WO | WO-2010009558 | 1/2010 |

OTHER PUBLICATIONS

International Search Report (ISR) and Written Opinion of the International Searching Authority (ISA/KR) for counterpart PCT Patent Application No. PCT/US2011/034706, dated Nov. 30, 2011, 9 pages.
Gibson, Gary A., et al., Luminescent Enhancement of Reflective Displays, IEEE Photonics Society 2010 23rd Annual Meeting, 2010, pp. 69-70.

* cited by examiner

*Primary Examiner* — Tuyen Tra
(74) *Attorney, Agent, or Firm* — HP Inc. Patent Department

(57) ABSTRACT

A reflective color display pixel has a top surface for receiving ambient light, and a plurality of sub-pixels including a first sub-pixel and a second sub-pixel. The first sub-pixel has a luminescent layer for absorbing a portion of the ambient light and emitting light of a first color. The second sub-pixel has a color tunable reflector for reflecting the ambient light in a selected band.

18 Claims, 5 Drawing Sheets

REFLECTIVE COLOR DISPLAY PIXEL

BACKGROUND

Reflective electronic displays are a new type of display device that is gaining popularity and has already been widely used in electronic book readers. In contrast to conventional flat-panel displays, such as LCD displays, that require their own light sources, reflective displays utilize ambient light for illumination to display images that can mimic the look of "ink-on-paper" printed materials. Due to the use of ambient light for illumination, reflective displays have the significant advantages of lower power consumption compared to conventional displays, and the ability to be viewed under bright ambient light. Most of the reflective displays currently commercially available are monochromatic displays, and many prototype reflective color displays can only generate relatively dim colors that look faded. It is desirable to have reflective displays that can produce high-quality color images with satisfactory color lightness.

BRIEF DESCRIPTION OF THE DRAWINGS

Some embodiments of the invention are described, by way of example, with respect to the following figures.

DETAILED DESCRIPTION

The description below describes various embodiments of a reflective color display pixel that utilizes color tunable reflectors (CTR) in its sub-pixels, and in some embodiments in combination with luminescent layers. The combination of luminescence and color tunable reflection provides not only a greater color gamut with enhanced color lightness, but also flexibility in operating the sub-pixels of a color pixel to achieve a desired color.

Figure 1:
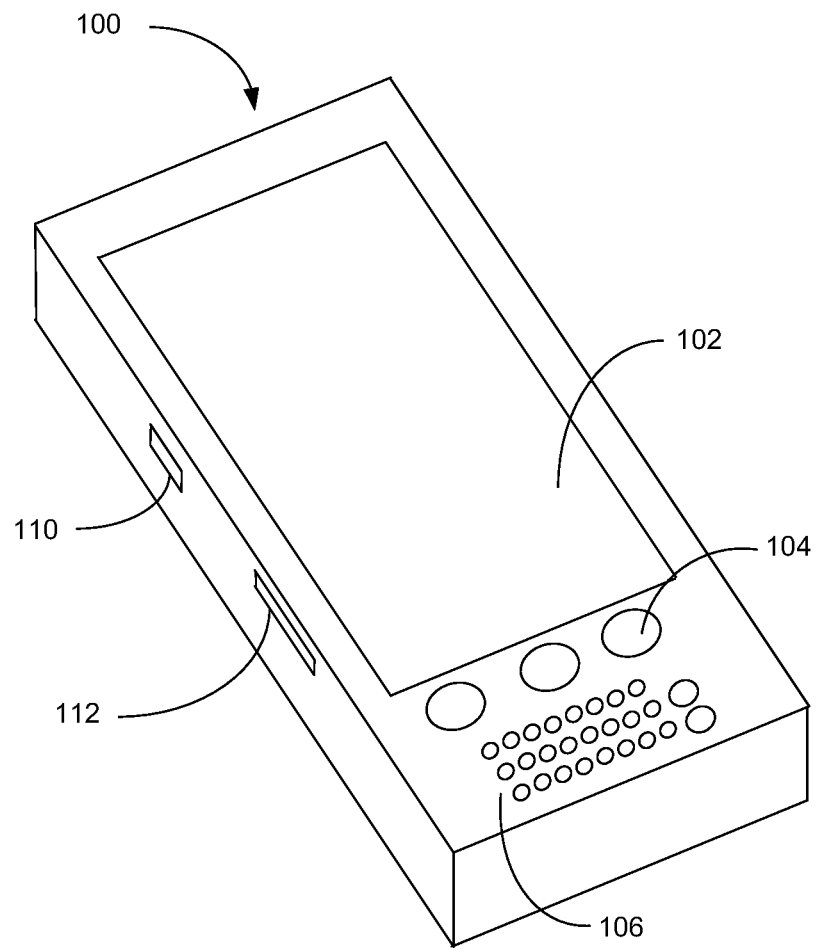
FIG. 1 is a schematic view of a display device with a reflective color display of an embodiment of the invention.

FIG. 1 shows an example of a display device utilizing such a color reflective display. The device 100 has a built-in power source, such as a rechargeable battery, and has electronic circuitry and software for its operations. As illustrated in FIG. 1, the device 100 may have buttons 104 for controlling image display functions and may have a keypad 106 for data entry. Moreover, the display screen 102 may be a touch-screen that can display control features such as scroll bars or control buttons. As known in the art, the display device 100 may also have a microphone or camera in conjunction with voice recognition or gesture recognition capability for input or control features. The display device 100 further includes means for receiving data of images to be displayed. For instance, the device 100 may have USB ports 110 for receiving data and power transmitted through a USB cable, or to receive a USB memory stick with the image date stored thereon. The device 100 may also have receptacles, such as an SD card slot 112, for other types of data storage devices. Alternatively, the device 100 may have wireless transmission capabilities for wirelessly downloading image data from and uploading input or control signals to a computer or a networked resource such as the internet or cloud computing infrastructure.

Figure 2:
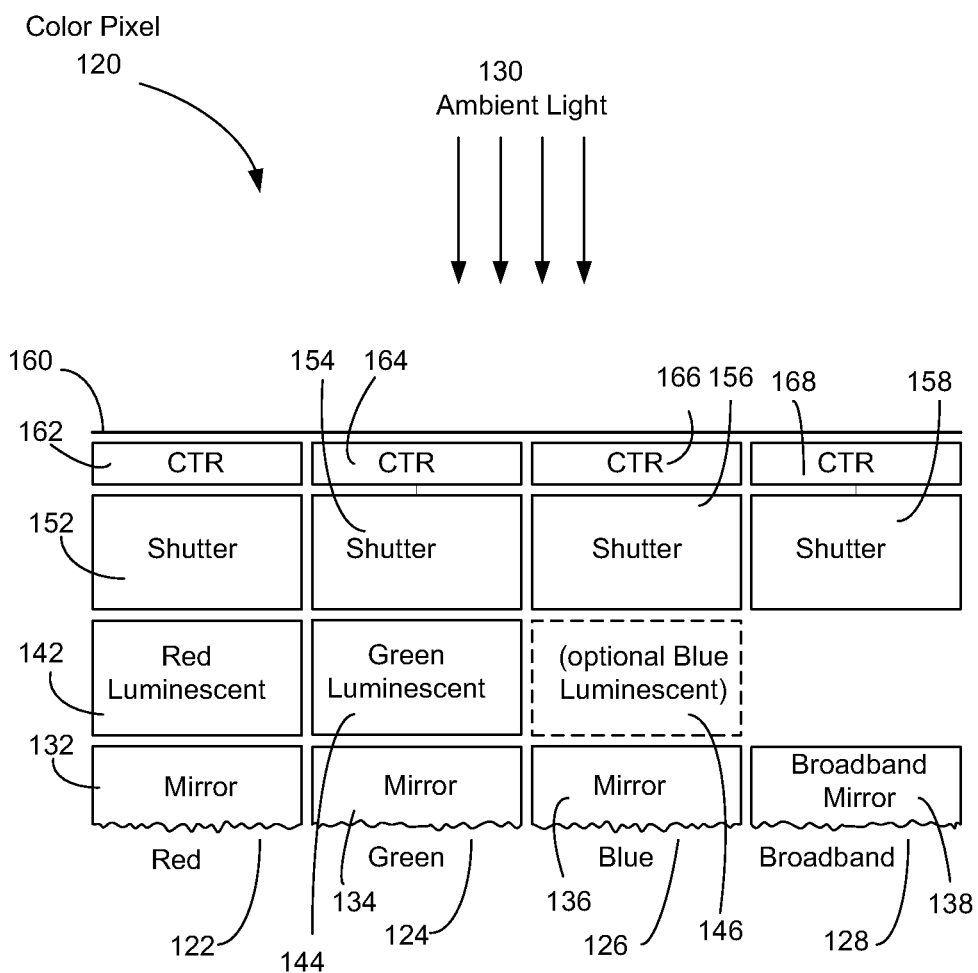
FIG. 2 is a schematic cross-sectional view of a reflective color pixel constructed according to an embodiment of the invention.

FIG. 2 shows a schematic representation of a reflective color pixel 120 that may be used in the color display screen 102 of FIG. 1. In this embodiment, the color pixel 120 has a plurality of sub-pixels, including a red sub-pixel 122, a green sub-pixel 124, a blue sub-pixel 126, and a broadband sub-pixel 128. Ambient light 130 from the viewing side, or the front side, of the pixel 120 impinges on a top surface 160 of the pixel. As described in greater detail below, the ambient light 130 is used as an energy source for the sub-pixels of the display pixel 120 to generate light of selected colors for viewing by a user. As used herein, the phrases "generate light" or "emit light" mean broadly that a sub-pixel returns light to a viewer, and such returned light is derived from reflecting the incident ambient light or converting the ambient light via luminescence.

The color pixel 120 provides satisfactory colors with high color lightness by combining luminescence and tunable color reflection in one or more of its sub-pixels. Turning first to the luminescence aspect, the color pixel 120 achieves efficient utilization of ambient light to produce colors by means of luminescence. In this regard, a luminescent material containing luminophores can strongly absorb light over a broad band of wavelengths shorter than a threshold wavelength and re-emit a large fraction of the absorbed energy at energies below (and hence, wavelengths above) the absorption threshold. Thus, some otherwise wasted light can be converted into a desired color, thereby enabling more efficient utilization of ambient light to provide greater lightness and better color saturation. For instance, the red sub-pixel 122 includes a luminescent layer 142 containing luminophores that absorb light of shorter wavelengths and emit light in the red band. The near-UV to green portion of the ambient light 130 incident on the red sub-pixel 122 is absorbed by the luminescent layer 142 and converted into red light. The luminescent red light can be emitted through the top surface 160 for viewing by a user. The red sub-pixel 122 includes a mirror 132 disposed below the red luminescent layer for reflecting downwardly-emitted red luminescent light toward the top surface 160. This mirror may also reflect longer ambient red wavelengths not absorbed by the luminescent layer 142. Additionally, this mirror may also reflect shorter ambient wavelengths that are not absorbed by the luminescent layer 142 during the first pass but are substantially absorbed after two passes through the luminescent layer 142. The mirror 132 may be diffusive so that the reflected light is not concentrated in a narrow solid angle. To control the emission intensity of the red sub-pixel 122, an electro-optical shutter 152 is disposed above the luminescent layer 142. The shutter 152 may be in the form of, for example, dichroic dye-liquid crystal (LC) guest-host systems, electrophoretic, electro-wetting, or electro-fluidic cells. It can be tuned from transparent through various shades of gray to opaque. It controls the transmission of ambient light to the luminescent layer 142 and wavelength-selective mirror 132 as well as transmission of the red luminescent light toward the top surface 160.

Luminescence can also be used by the other sub-pixels of the color pixel 120 for generating other colors. For example, the green sub-pixel 124 also has a luminescent layer 144 containing a green luminescent material that absorbs light of wavelengths shorter than green and emits light in a green band. A shutter 154 is disposed above the green luminescent layer 144 to controlling the intensity of light entering and leaving the luminescent layer. A diffusive mirror 134 is disposed below the green luminescent layer 144 to reflect green luminescent light toward the top viewing surface 160 and, optionally, some longer green ambient wavelengths not absorbed by the luminescent layer 144 or shorter wavelengths not absorbed by the luminescent layer 144 in one pass but substantially absorbed in two passes. The mirror 134 is color-selective such that it does not reflect in the red band, so that the red light in the ambient light, which is not absorbed by the green luminescent material, will not be reflected and returned by the green sub-pixel 124. A color-selective mirror may be formed of, for example, a Bragg stack, cholesteric reactive mesogens, or a color filter layer combined with a broadband mirror.

Luminescence may also to be used for generating the blue light by including a blue luminescent layer 146 in the blue sub-pixel. Nevertheless, as the blue luminescent material absorbs light in the relatively narrow range of from NUV to shortly above the blue emission band, the efficiency improvement by means of luminescence in the blue band may not be as significant as that for the green or red emission bands. Alternatively, as shown in the embodiment of FIG. 2, the blue sub-pixel 126 may simply use color-selective reflection to produce blue light, without using luminescence. To that end, the blue sub-pixel 126 has a color-selective mirror 136 that reflects in the blue range. A shutter 156 is disposed above the mirror 136 to control light intensity of the sub-pixel. Ambient light 130 goes through the shutter 156 and impinges on the blue-reflecting mirror 136, and the blue portion of the ambient light is reflected by the mirror 126 back through the shutter 156 for viewing by the user.

To enhance white production, the color pixel 120 further includes a broadband sub-pixel 128. The broadband sub-pixel 128 has a shutter 158 and a broadband mirror 138, which reflects ambient light that goes through the shutter. The broadband sub-pixel 128 can be used in conjunction with the red, green, and blue color sub-pixels to improve the lightness or color balance of the pixel.

Turning now to the aspect of tuned color reflection, in the embodiment of FIG. 2, each of the sub-pixels 122, 124, 126, 128 includes a color tunable reflector (CTR). The color tunable reflectors 162, 164, 166, 168 in this embodiment are disposed above the shutters 152, 154, 156, 158 of the respective sub-pixels. Each of the color tunable reflectors may be tuned, such as by means of a bias voltage, to reflect light in a selective band of the color spectrum. The reflection band of a color tunable reflector may be tuned from near-UV (NUV) to near-infrared (NIR). One example of a color tunable reflector is a film of a photonic crystal-based display material produced by Opalux Inc. in Toronto, Canada. Such a color tunable reflective surface can achieve a range of color states that describe an arc in the CIE chromaticity diagram representative of the human color gamut. A substantial portion of the light that is not reflected is transmitted. Another example of a color tunable reflector is a reflective layer based a tunable plasmonic structure, such as that described in U.S. Pat. No. 7,889,420, entitled "Plasmon-based Color Tunable Devices."

The use of color tunable reflectors in combination with luminescence allows a larger, brighter color gamut to be obtained, and also provides significant flexibility in the operation of the color pixel 120 to generate various desired colors. By way of example, in the embodiment of FIG. 2, all the three primary colors (those colors generated by the individual color sub-pixels, in this case R, G, B) can be made brighter than without the color tunable reflectors, because a larger fraction of the display area of the color pixel 120 can be used to produce each color. This can be seen by considering the production of blue light as an example. To display the blue color, the blue sub-pixel 126 is used to produce blue light. To that end, the shutter 156 of the blue sub-pixel 126 is opened fully or partially, depending on the desired intensity. The color tunable reflector 166 of the blue sub-pixel is tuned to reflect either in the UV or infrared range, which in effect makes the color tunable reflector 166 transparent to the visible color spectrum. The color-selective mirror 136 reflects the blue portion of the incident light toward the top surface for viewing. In addition, one or more of the red, green, and broadband sub-pixels 122, 124,128 can also be used to generate blue light. This is done by tuning their color tunable reflectors to reflect blue light, together with turning their shutters off so that the non-reflected wavelengths do not pass through to the layers below. The total intensity of blue light generated by the color pixel 120 is thus the sum of the blue light generated by the four sub-pixels. In this way, a major portion of the blue light incident on the entire pixel 120 can be used to produce the blue color. This allows the blue emission achievable by the pixel to be significantly higher than that produced by the blue sub-pixel 126 alone.

In this regard, because the color tunable reflectors in this embodiment are placed above the corresponding shutters of the sub-pixels, there is no fine control of the amount of blue light reflected by each color-tunable reflector. Nevertheless, the overall intensity of the blue light generated by the color pixel can still be finely adjusted. This is because the shutter 156 of the blue sub-pixel 126 can be used to adjust the output of that sub-pixel in an "analog," or continuously variable, fashion. The inclusion of this adjustable portion allows the total pixel output to be tuned to a desired level.

Similarly to the production of blue light, some or all sub-pixels of the color pixel 120 can contribute to the generation of green light. For that operation, the shutter 154 of the green sub-pixel 124 is opened, and the color tunable reflector 164 is tuned to reflect in UV or infrared. The portion of the incident light with wavelengths shorter than green is absorbed by the green luminescent layer 144 and converted into light in the green emission band. In the meantime, each of the blue, red, and broadband sub-pixels 126, 122, 128 can be used to generate green light by tuning its color tunable reflector to reflect green light and closing its shutter. The generation of red light can similarly be enhanced by the combination of red luminescence from the red sub-pixel 122 and the red light reflected by the color tunable reflectors of the other sub-pixels.

Besides the enhanced intensity of each of the three primary colors, the overall intensity of a mixed color (i.e., a color generated by mixing two or more of the primary colors) can also be enhanced. For instance, the color tunable reflector 168 of the broadband sub-pixel 128 can be tuned to contribute to the mixed color. If the primary color of one of the red, green, and blue sub-pixels is not needed for the mixed color, the color tunable reflector of that sub-pixel can also be tuned to contribute to the mixed color.

Moreover, the inclusion of the color tunable reflectors allows the flexibility of producing two colors from one sub-pixel. This is achieved by tuning the color tunable reflector of a primary color sub-pixel to reflect light of a color different from that primary color, while opening the shutter below so that the sub-pixel also generates that primary color. For instance, if a desired color output requires more red than the red sub-pixel alone can generate, the color tunable reflector 164 of the green sub-pixel 124 can be tuned to reflect red light, while the shutter 154 of the green sub-pixel is open. The color tunable reflector 164 reflects the red band in the ambient light incident on the green sub-pixel 124, while light of wavelengths shorter than green passes through the color tunable reflector 164 and the shutter 154 and is absorbed by the green luminescent layer 144 and converted to green light. In this case, the red reflection by the green sub-pixel 124 is a more efficient use of the ambient light, because the red light incident on that sub-pixel will otherwise be absorbed by the color-selective mirror 134 of the green sub-pixel.

As another example of enhanced efficiency, to generate white, the color tunable reflector 168 of the broadband sub-pixel 128 is tuned to reflect UV or infrared, and the shutter 158 is open to allow the broadband mirror 138 to reflect white light. In the meantime, the red sub-pixel 122 is operated to provide red light, with its shutter 152 open and its CTR 162 tuned to the NIR or NUV to render it substantially transparent to visible light. The color reflector 164 of the green sub-pixel 124 can be tuned to reflect yellow, and the color reflector 166 of the blue sub-pixel 126 can be tuned to reflect cyan. The shutters 154 and 156 of the green and blue sub-pixels can be opened so as to allow the luminescent layers 144 and 146 (if present) to emit green and blue light, respectively. With the proper choice of relative sub-pixel areas, the total of all the light returned by all the sub-pixels produces the appearance of white light. This approach allows brighter white to be generated for the given pixel area. Overall, the combination of luminescence and tunable color reflection allows a greater color gamut to be achieved, with better lightness and a brighter white state.

Figure 3:
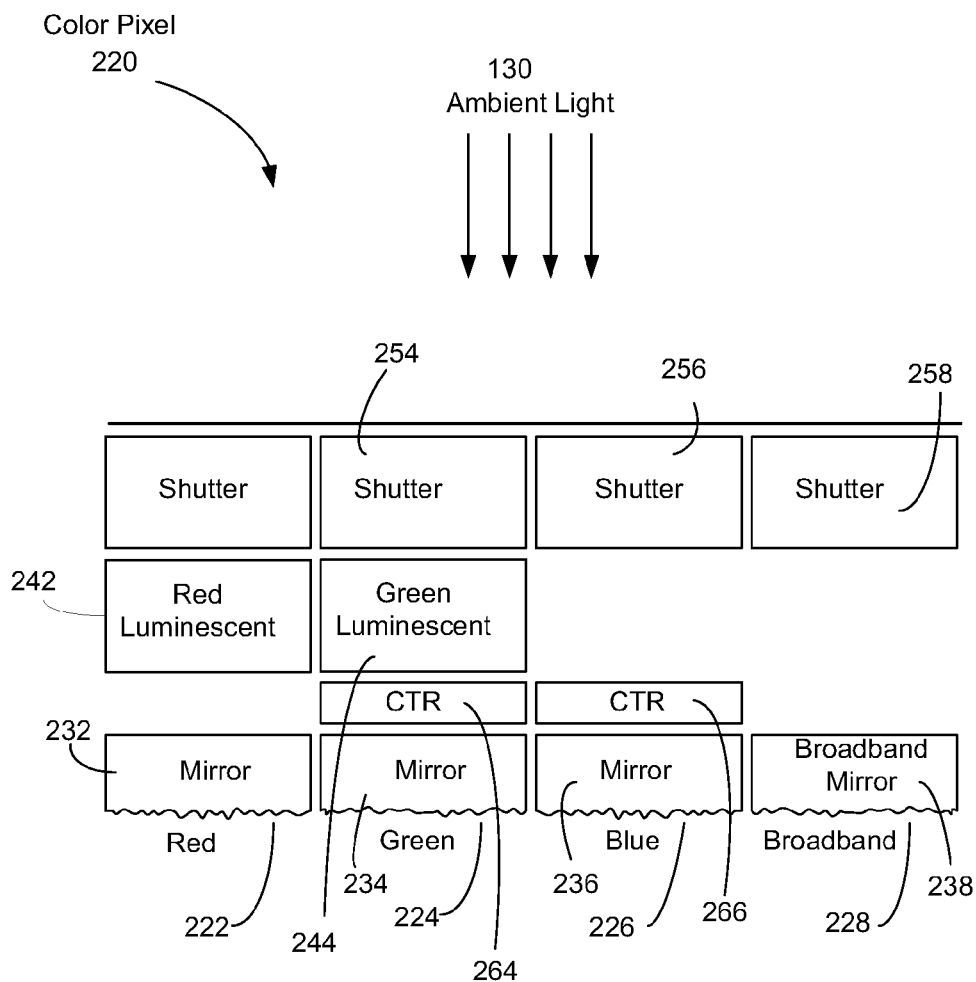
FIG. 3 is a schematic cross-sectional view of another embodiment of a reflective color pixel.

In the embodiment of FIG. 2, the color tunable reflectors are placed above the shutters of the sub-pixels. Nevertheless, color tunable reflectors may be placed between other layers of the color pixel to provide similar benefits. FIG. 3 shows an embodiment of a color pixel 220 in which color tunable reflectors are disposed right above the mirrors of the sub-pixels. Specifically, the green sub-pixel 224 has a color tunable reflector 264 disposed between the green luminescent layer 244 and the color selective mirror 234. The blue sub-pixel 226, which does not have a luminescent layer in this embodiment, has a color tunable reflector 266 disposed above the blue-reflecting mirror 236. In contrast, no color tunable reflector is used in the red sub-pixel 222 or the broadband sub-pixel 228. To generate a primary color, the shutter of the sub-pixel for that primary color is opened, and the shutters of the other sub-pixels are closed. The color tunable reflector of that primary color sub-pixel is either tuned to reflect in UV or infrared (i.e., transparent in the visible range) or tuned to reflect the primary color. Continuous intensity adjustment for each sub-pixel can be performed by means of the shutter of that sub-pixel. By including a color tunable reflector, each of the blue and green sub-pixels 226 and 224 can produce two colors at the same time. For instance, the color tunable reflector 266 in the blue sub-pixel 226 can be tuned to reflect red or green light, while the color-selective mirror 236 reflects blue light. Similarly, the color tunable reflector 264 in the green sub-pixel 224 can be tuned to reflect red light, while the green luminescent layer 244 converts the shorter-wavelength portion of the incident light into green emission.

In general, it may be desirable to incorporate the color tunable reflectors below the luminescent layers, if the color tunable reflectors exhibit "tails" in their reflection spectra that cause significant reflections at undesirable wavelengths. Such tails could degrade the dark state of the color display, if the color tunable reflectors are placed at the top of the layer stack. Placing a color tunable reflector below the corresponding luminescent layer may also be desirable if the color tunable reflector has unwanted absorption at some wavelengths within the absorption band of the luminescent layer.

Figure 4:
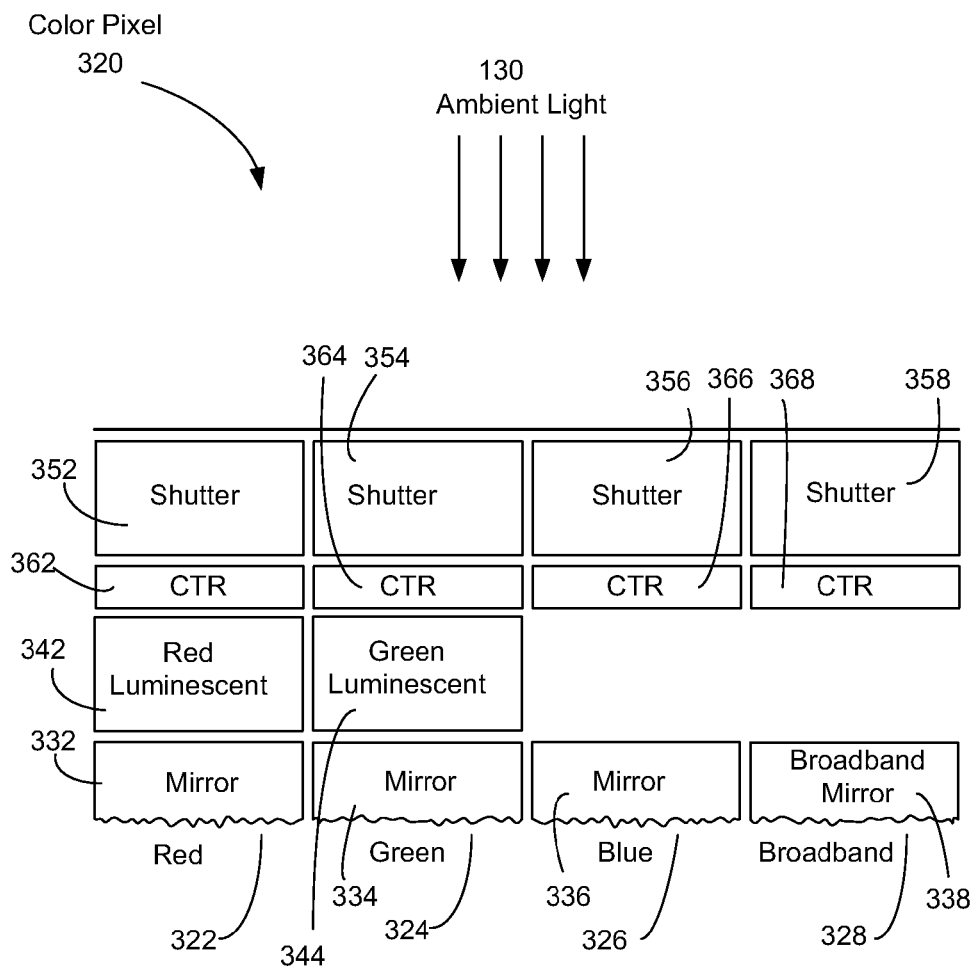
FIG. 4 is a schematic cross-sectional view of a third embodiment of a reflective color pixel.

FIG. 4 shows another embodiment of a reflective color pixel 320. In this embodiment, color tunable reflectors are disposed immediately below the shutters. Specifically, the color tunable reflector 362 of the red sub-pixel 322 is disposed between the shutter 352 and the red luminescent layer 342, and the color tunable reflector 364 of the green sub-pixel 324 is disposed between the shutter 354 and the green luminescent layer 344. The blue sub-pixel 326, which optionally does not use luminescence, has its color tunable reflector 366 disposed below the shutter 356 and above the blue-reflecting mirror 326. The broadband sub-pixel 328 also optionally has a color tunable reflector 368, disposed below the shutter 358 and above the broadband mirror 338. For generating any of the three primary colors, the red, green, and blue sub-pixels 322, 324, 326 are operated the same way as without the color tunable reflectors. The color gamut is improved, however, in the generation of mixed colors. For instance, for the red pixel 322 or green sub-pixel 324, the color tunable reflector 362 or 364 can reflect a color that is different from the color generated by the luminescent layer 342 or 344. Similarly, the color reflector 366 of the blue sub-pixel 326 can reflect a color different from the blue color reflected by the color-selective mirror 336.

It should be noted that as few as two sub-pixels could be used to achieve a reasonably full color gamut. For example, a color pixel like that of the embodiment of FIG. 4 but including only the green and red sub-pixels 322 and 324 can be used. To produce blue, one or both color tunable reflectors of the sub-pixels can be set to reflect blue, while the luminescent layers 342 and 344 can still generate red and green light, respectively. Moreover, a reasonably broad color gamut can be created even without the use of the luminescent layers. For instance a pixel containing two sub-pixels like the sub-pixels 326 and 328, but with the mirrors 336, 338 replaced with light-absorbing layers, can be used. In that case, the two color tunable reflectors can each be tuned from blue to red, and the shutters 356, 358 can be used to control the intensity of the reflection from each sub-pixel. Thus, a weighted combination of the reflected light from the two color tunable reflectors can be used to create intermediate colors and gray scale (including white).

Figure 5:
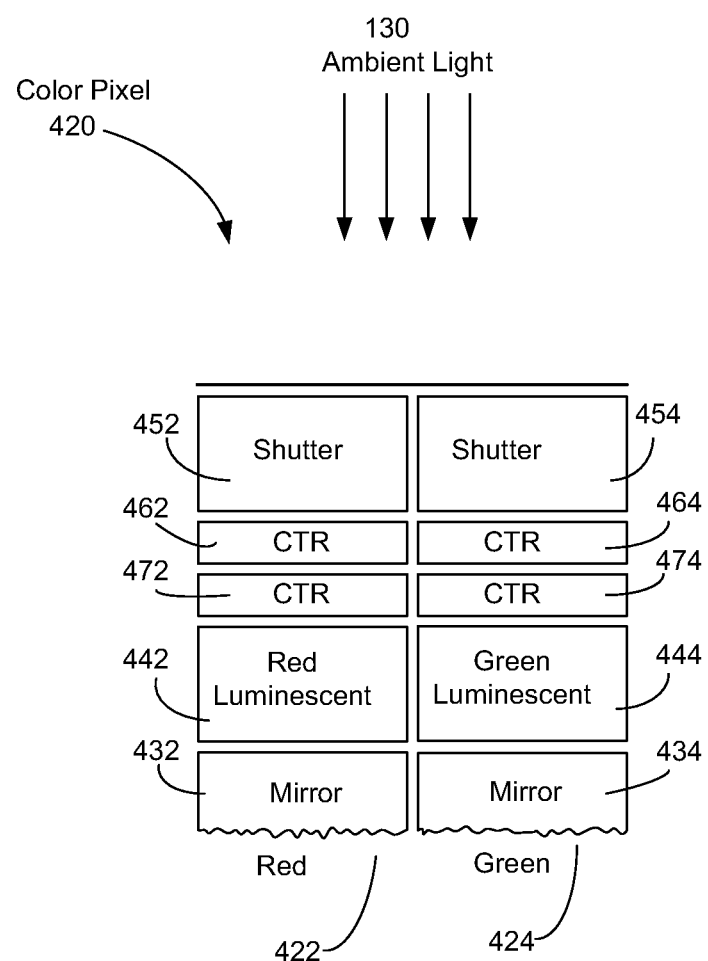
FIG. 5 is a schematic cross-sectional view of a fourth embodiment of a reflective color pixel.

FIG. 5 shows another embodiment of a color pixel. This embodiment shows that two color tunable reflectors can be stacked in one sub-pixel. Specifically, in the embodiment of FIG. 5, the color pixel 420 has only two sub-pixels 422 and 424. The first sub-pixel 422 has two color tunable reflectors 462 and 472 placed below a shutter 452 and a luminescent layer 442. A color-selective diffusive 432 mirror is disposed below the luminescent layer to reflect light in the color band produced by the luminescent layer. The two color tunable reflectors 462 and 472 can be tuned separately to reflect two different colors. Similarly, the sub-pixel 424 has two color tunable reflectors 464 and 474 disposed below a shutter 454 and above a luminescent layer 444 and a color-selective diffusive mirror 434. The luminescent layers 442 and 444 of the two sub-pixels may produce luminescent light of different colors. For instance, the luminescent layer 442 of the first sub-pixel 422 may contain luminophores for producing red light, while the luminescent layer 444 of the second sub-pixel 424 may contain luminophores for producing green light. Thus, each sub-pixel may be operated to produce light in up to three color bands, and the combination of the two sub-pixels enables a broad color gamut.

In all the embodiments described above, the color-tunable reflectors may be activated by a separate electronic backplane. For example, in the embodiment of FIG. 2, the backplane may be inserted immediately below the color tunable reflectors 162, 164, 166, 168, if it is reasonably transparent. Alternatively, in some embodiments, both the shutters 152, 154, 156, 158 and the color tunable reflectors 162, 164, 166, 168 may be driven by a single backplane disposed at the bottom of the stack. In that case, the backplane does not have to be transparent. In this regard, there are various ways to achieve independent control of the state of a color tunable reflector and the state of the corresponding shutter connected in series using a single backplane. For example, if the shutter is bi-stable or meta-stable, and requires a large bias to switch relative to the bias required for tuning the color tunable reflector, it can be switched first to its desired state. An appropriate lower bias may then be applied across the stacked color tunable reflector and shutter, such that the color tunable reflector is set to and held in its desired state. If the bias required for tuning the CTR is small compared with that required for changing the state of the shutter, the shutter's state will not be affected by tuning of the CTR. Also, in some embodiments, a combination of AC and DC fields may be used to achieve independent control of the color tunable reflector and the shutter. For example, if the shutter comprises a dichroic dye "guest" in a liquid crystal "host" (GHLC), then an AC field can be used to control the GHLC at a frequency to which the color tunable reflector does not respond. A DC component with an amplitude too small, or a pulse width too short, to affect the GHLC can then be used to set the color tunable reflector.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A reflective color display pixel comprising:
    a top surface for receiving ambient light; and
    a plurality of sub-pixels including a first sub-pixel and a second sub-pixel, the first sub-pixel having a luminescent layer for absorbing a portion of the ambient light and emitting light of a first color, and the second sub-pixel having a color tunable reflector for reflecting the ambient light in a tunable band.

2. The reflective color display pixel as in claim 1, wherein the first sub-pixel includes a color tunable reflector.

3. The reflective color display pixel as in claim 2, wherein the second sub-pixel includes a luminescent layer for absorbing a portion of the ambient light and emitting light of a second color.

4. The reflective color display pixel as in claim 2, wherein the color tunable reflector of the first sub-pixel is disposed above the luminescent layer of the first sub-pixel.

5. The reflective color display pixel as in claim 4, wherein the first sub-pixel further includes a shutter disposed between the color tunable reflector and the luminescent layer of the first sub-pixel.

6. The reflective color display pixel as in claim 2, wherein the first sub-pixel further includes a shutter disposed above the luminescent layer and the color tunable reflector of the first sub-pixel.

7. The reflective color display pixel as in claim 6, wherein the first sub-pixel further includes a second color tunable reflector disposed below the shutter of the first sub-pixel.

8. The reflector color display pixel as in claim 1, wherein the second sub-pixel includes a shutter disposed above the color tunable reflector of the second sub-pixel.

9. A reflective color display pixel comprising:
    a top surface for receiving ambient light; and
    a plurality of sub-pixels including a first sub-pixel and a second sub-pixel, each of the first and second sub-pixels having a color tunable reflector for reflecting light in a tunable band and a shutter for controlling transmission of light,
    wherein the first sub-pixel includes a luminescent layer for absorbing a portion of the ambient light and emitting light of a first color.

10. The reflective color display pixel as in claim 9, wherein the shutter in each of the first and second sub-pixels is disposed above the color tunable reflector of that sub-pixel.

11. The reflective color display pixel as in claim 9, wherein the second sub-pixel includes a luminescent layer for absorbing a portion of the ambient light and emitting light of a second color.

12. The reflective color display pixel as in claim 11, further including a third sub-pixel for emitting light of a third color.

13. The reflective color display pixel as in claim 9, wherein the shutter in the first sub-pixel is disposed below the color tunable reflector and above the luminescent layer of that the first sub-pixel.

14. The reflective color display pixel as in claim 9, wherein the color tunable reflector of the first sub-pixel is disposed below the luminescent layer of the first sub-pixel.

15. A display with reflective color display pixels comprising:
    a top surface for receiving ambient light; and
    an array of pixels parallel to the top surface, each pixel comprising:
        a plurality of sub-pixels including a first sub-pixel and a second sub-pixel, each of the first and second sub-pixels having a color tunable reflector for reflecting light in a tunable band and each of the first and second sub-pixels having a shutter for controlling transmission of light,
    wherein each pixel further comprises a broadband sub-pixel.

16. The display as in claim 15, wherein the shutter in each of the first and second sub-pixels is disposed between the color tunable reflector of that sub-pixel and the top surface.

17. The display as in claim 16, wherein the first sub-pixel includes a luminescent layer for absorbing a portion of ambient light and emitting light of a first color.

18. The display as in claim 15, wherein the broadband sub-pixel further comprises a shutter and a broadband mirror.

* * * * *